United States Patent [19]

Ficken

[11] Patent Number: 4,730,750

[45] Date of Patent: Mar. 15, 1988

[54] VENDING MACHINE FOR DISPENSING REFRIGERATED AND UNREFRIGERATED FOODS

[75] Inventor: Leonard A. Ficken, St. Louis County, Mo.

[73] Assignee: Unidynamics Corporation, New York, N.Y.

[21] Appl. No.: 857,937

[22] Filed: Apr. 3, 1986

[51] Int. Cl.⁴ .............................................. B65G 59/00

[52] U.S. Cl. .................................... 221/124; 221/129; 221/133; 221/150 R; 221/194

[58] Field of Search ................... 221/150 R, 129, 126, 221/133, 123, 124, 155, 191, 194, 195, 258, 287, 289; 312/36, 42

[56] References Cited

U.S. PATENT DOCUMENTS

| | | | |
|---|---|---|---|
| Re. 31,162 | 3/1983 | Bachmann et al. | 194/1 |
| 1,734,045 | 11/1929 | Parran . | |
| 2,325,363 | 7/1943 | Blake | 312/42 |
| 2,834,510 | 5/1958 | Cenotti | 221/79 |
| 2,956,660 | 10/1960 | Nordquist | 221/281 X |
| 2,963,883 | 12/1960 | Teesdale | 221/124 X |
| 3,160,255 | 12/1964 | Ferraro et al. | 194/1 |
| 3,178,055 | 4/1965 | Schuller | 221/75 |
| 3,722,745 | 3/1973 | Gushi et al. | 221/130 |
| 3,737,071 | 6/1973 | Offutt et al. | 221/129 |
| 3,795,345 | 3/1974 | Baxendale | 221/125 |
| 3,986,759 | 10/1976 | Holstein et al. | 312/257 A |
| 4,248,358 | 2/1981 | Muench | 221/150 A |
| 4,368,829 | 1/1983 | Lotspeich et al. | 221/129 X |
| 4,485,937 | 12/1984 | Adams | 221/129 |
| 4,512,453 | 4/1985 | Schuller et al. | 194/200 |
| 4,629,090 | 12/1986 | Harris et al. | 221/150 R |

FOREIGN PATENT DOCUMENTS

| | | | |
|---|---|---|---|
| 241935 | 12/1962 | Australia | 221/150 R |

*Primary Examiner*—Joseph J. Rolla
*Assistant Examiner*—David H. Bollinger
*Attorney, Agent, or Firm*—Senniger, Powers, Leavitt and Roedel

[57] ABSTRACT

A vending machine for dispensing refrigerated and unrefrigerated foods. The vending machine includes a housing having a refrigerated storage and dispensing area for the refrigerated foods separate from an unrefrigerated storage and dispensing area for the unrefrigerated foods. The vending machine also includes a device contained in the housing for cooling the refrigerated foods in the refrigerated storage and dispensing area. The vending machine also includes a common receiving device adjacent the refrigerated and unrefrigerated storage and dispensing areas for receiving dispensed foods from either area. The vending machine further includes a device for selecting one of the refrigerated foods or unrefrigerated foods to be dispensed to the common receiving device and a device responsive to the selecting device for dispensing the selected food to the common receiving device.

12 Claims, 8 Drawing Figures

VENDING MACHINE FOR DISPENSING REFRIGERATED AND UNREFRIGERATED FOODS

BACKGROUND OF THE INVENTION

This invention relates to a vending machine for dispensing both refrigerated foods, for example drink containers, and unrefrigerated foods such as packaged snacks.

It is generally known that vending machines can provide a refrigerated section to keep products cold. For example, food vending machines are known for dispensing sandwiches or cold drinks by inserting coins or bills. It is also generally known to provide vending machines which dispense products which are not refrigerated. For example, candy or snack food packages are generally kept in a non-refrigerated vending machine. Very often it is desired to have both unrefrigerated and refrigerated foods dispensed and at the same physical location, such as in an employee kitchen. However it is impractical due to space limitations to use both a refrigerated vending machine and an unrefrigerated vending machine. Some presently available vending machines have refrigerated and unrefrigerated sections or areas, but require all the dispensed products to pass through both the refrigerated and unrefrigerated sections prior to dispensing. In these vending machines it is not possible to independently or separately dispense the product from the refrigerated and unrefrigerated sections.

Very often the use of the non-refrigerated vending machine results in the candy or the like being destroyed because of melting, thus resulting in customer dissatisfaction or loss of the product. Because many unrefrigerated foods are most palatable at a temperature most near room temperature, it is generally not desirable to refrigerate this product down to a temperature for which unrefrigerated foods are enjoyed. Therefore it is undesirable, for example, to place candy or the like in a refrigerated machine since these machines typically cool to around 35°–45° F.

SUMMARY OF THE INVENTION

Among the several objects of the invention may be noted the provision of a vending machine permitting the dispensing of refrigerated product and unrefrigerated product from a single machine; the provision of such vending machine which is suitable for locations having space limitations; the provision of such vending machine which permits the independent and separate dispensing of refrigerated and unrefrigerated product; the provision of such vending machine which partially cools product in the unrefrigerated section of the vending machine; the provision of such vending machine which has a single selection control for choosing refrigerated and/or unrefrigerated product; and the provision of such vending machine which is economically feasible and commercially practical.

Briefly described, a vending machine of the present invention is for dispensing refrigerated and unrefrigerated foods. The vending machine includes a housing having a refrigerated storage and dispensing area for the refrigerated foods separate from an unrefrigerated storage and dispensing area for the unrefrigerated foods. The vending machine also includes a device contained in the housing for cooling the refrigerated foods in the refrigerated storage and dispensing area. The vending machine also includes a common receiving device adjacent the refrigerated and unrefrigerated storage and dispensing areas for receiving dispensed foods from either area. The vending machine further includes a device for selecting one of the refrigerated foods or unrefrigerated foods to be dispensed to the common receiving device and a device responsive to the selecting device for dispensing the selected food to the common receiving device.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
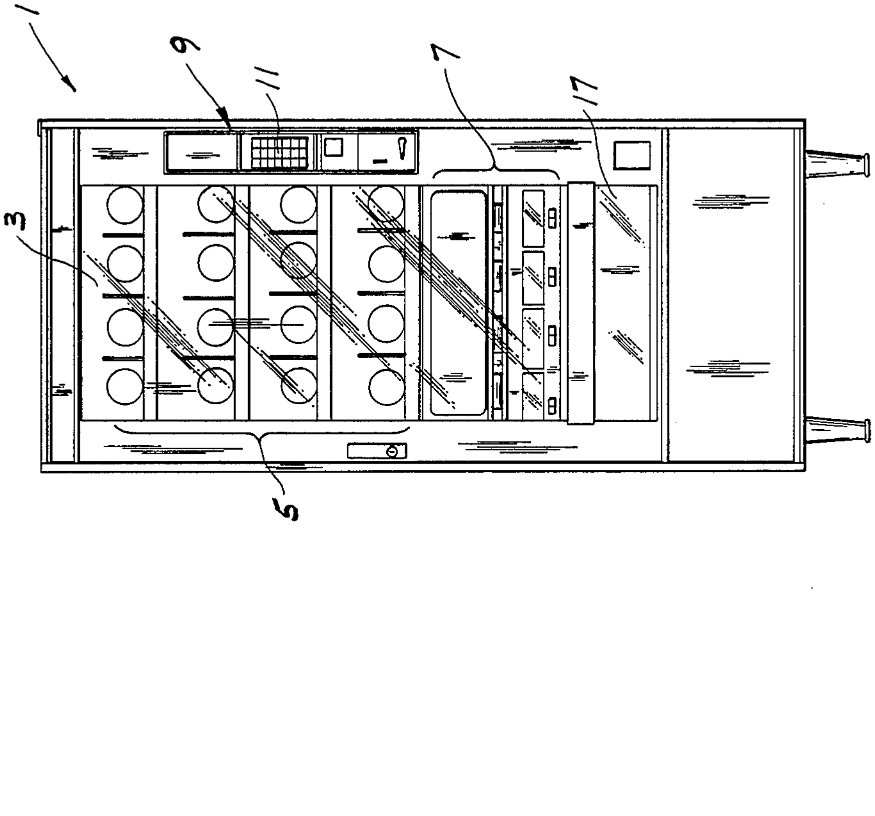
FIG. 1 is a front view of the vending machine of the present invention.

In FIG. 1 the vending machine 1 of the present invention has a door 3 having a clear see-thru panel for displaying foods in the vending machine. Unrefrigerated foods, such as candy or food packages, are displayed in the vending machine 1 in an upper section or unrefrigerated food storage and dispensing area 5. Analogously, refrigerated foods, such as drink containers or cans, are diplayed in a lower section or refrigerated food storage and dispensing area 7. A selection panel 9 has a plurality of push button switches 11 corresponding to a respective dispenser in the unrefrigerated or refrigerated storage and dispensing areas 5 and 7. The selection panel 9 includes a vendor control and selection system as described in U.S. Pat. No. 4,512,453, which is incorporated herein by reference. Money is inserted in the selection panel 9 and when a proper amount is inserted, push button switches 11 may be operated. In response to the pushed switch 11, refrigerated or unrefrigerated foods are dispensed to a common receiving device or curved shelf 18 which is accessible through an opening 17 in the door 3.

Figure 2:
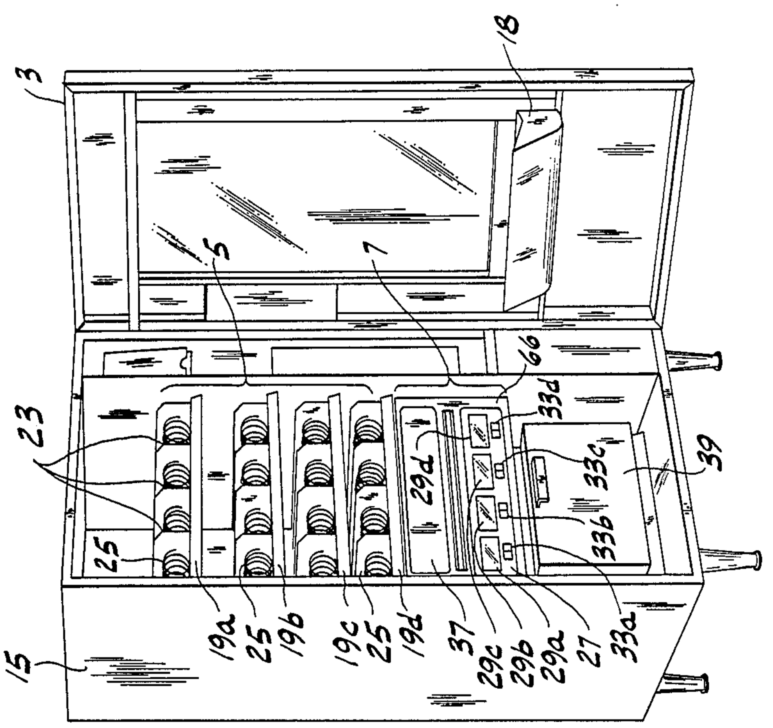
FIG. 2 is a perspective view of the vending machine of FIG. 1 with a front door opened.
Figure 3:
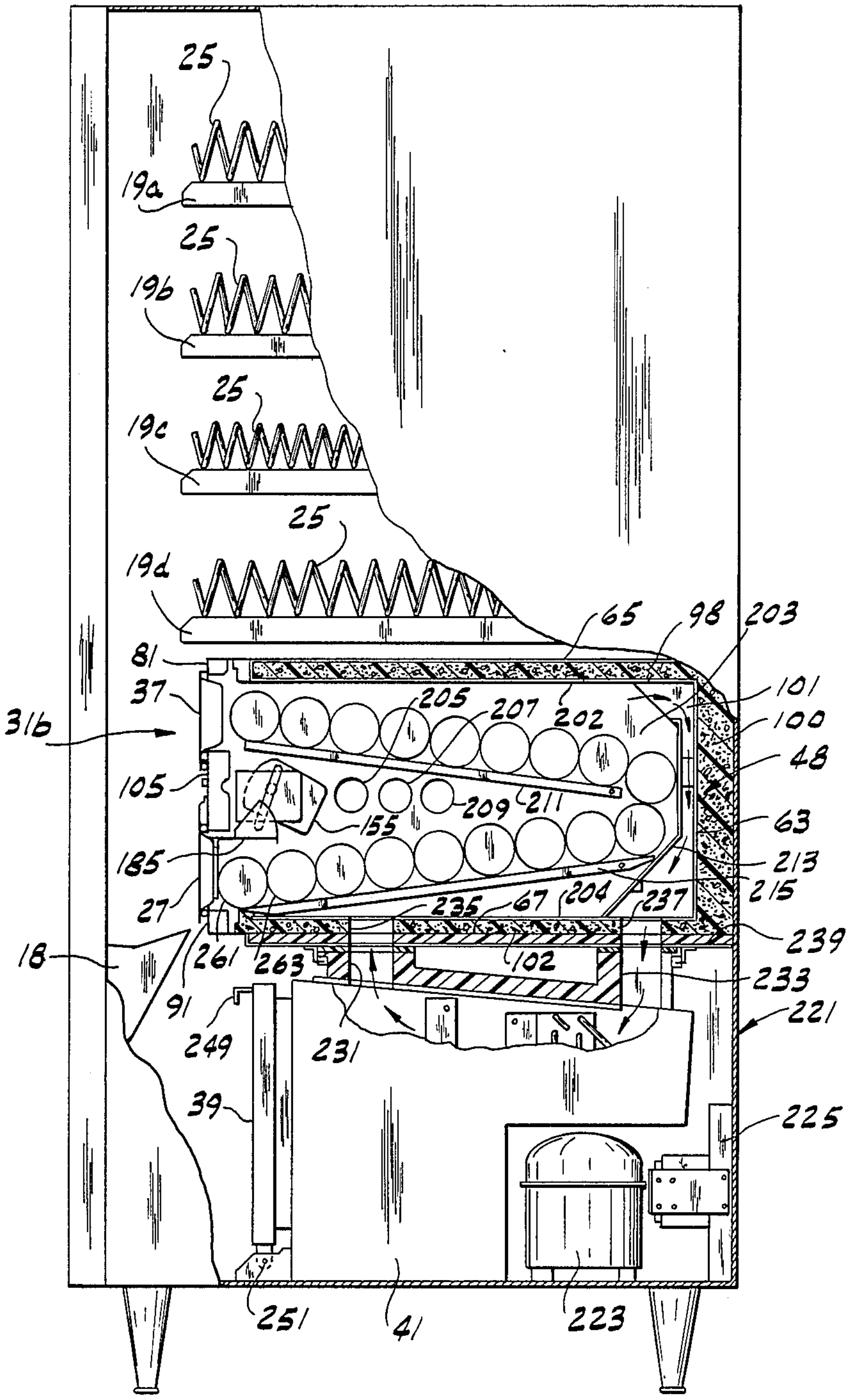
FIG. 3 is a side view of the vending machine in FIG. 1 with a portion cutaway showing an interior cross-section.
Figure 4:
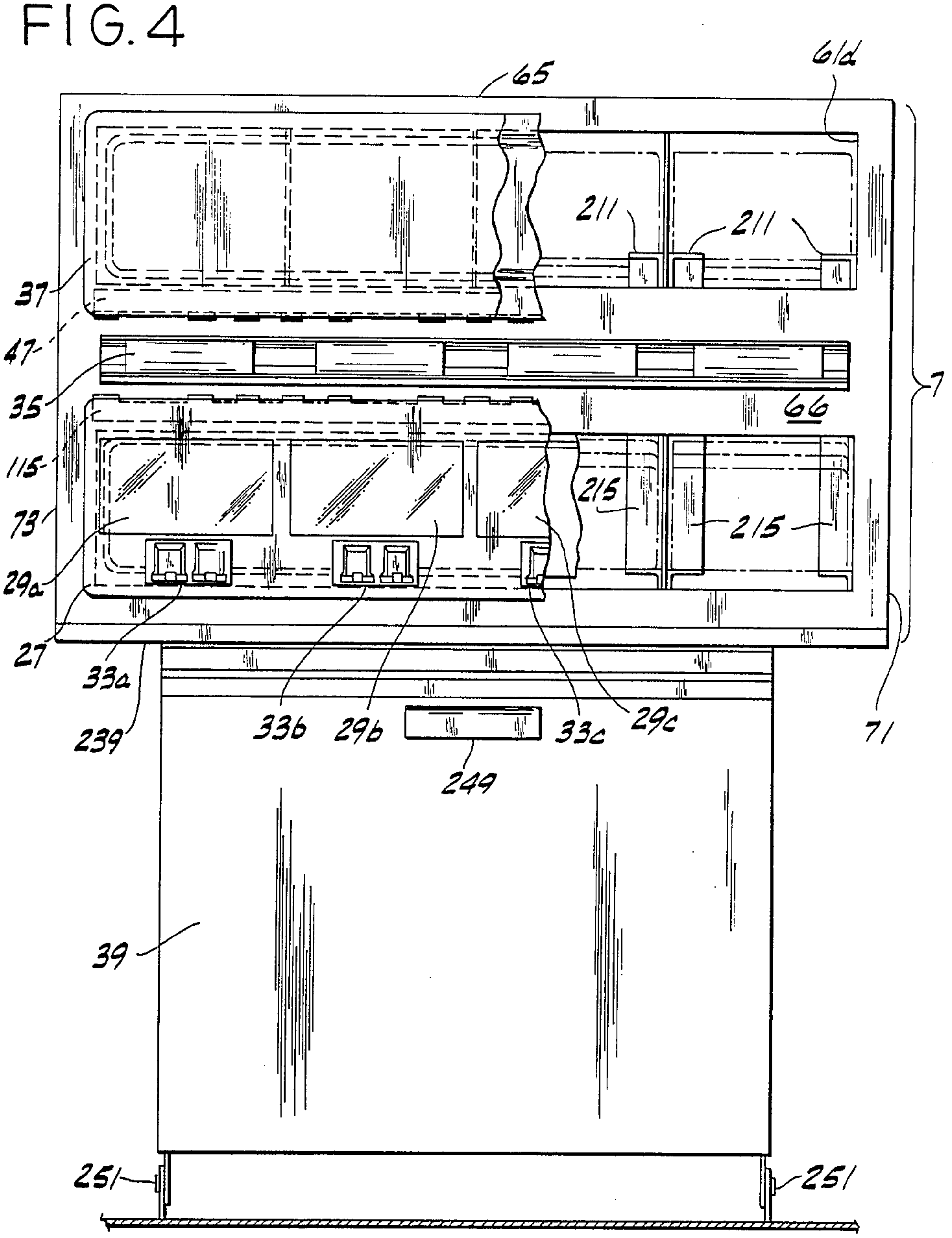
FIG. 4 is a close up view of a refrigerated area of the vending machine in FIG. 1 with a portion cutaway.

As may best be seen in FIGS. 2, 3 and 4, the door 3 is mounted on an exterior housing 15 and may be opened for access to the vending machine interior which includes both the unrefrigerated and refrigerated storage and dispensing areas 5 and 7. The housing 15 thus constitutes housing means having a refrigerated storage and dispensing area for the refrigerated foods separate from an unrefrigerated storage and dispensing area for the unrefrigerated foods.

The unrefrigerated storage and dispensing area 5 has four shelves 19*a*, 19*b*, 19*c* and 19*d*. Each of the shelves 19 has separators 23 between spiral arms 25 in which the unrefrigerated foods such as candy bars or snack food packages are placed. The spiral arms 25 are rotated by motors (not shown) in response to a machine controller as shown in FIG. 1 of U.S. Pat. No. 4,512,453 for dispensing the unrefrigerated foods. A dispenser having spiral arms for dispensing food packages is shown in U.S. Pat. No. 3,986,759, which is incorporated herein by reference.

The refrigerated storage and dispensing area 7 has a clear continuous door 27 masked so that four windows ***29a*, *29b*, *29c* and *29d* are outlined for displaying the drink can to be next dispensed from one of four corresponding dispensers *31a*, *31b*, *31c* and *31d*. For illustration purposes the dispenser *31b* is shown in FIG. 3. As will be appreciated from the discussion there are four dispensers 31. Labels *33a*, *33b*, *33c* and *33d* may be mounted below the corresponding window 29 for displaying such things as price and item number for the corresponding switch on the selection panel 9. Additional track labelling 35 may also be attached above the windows 29 to further identify the refrigerated foods e.g. brand names. A door 37 is mounted above the labelling 35 and may also have labels attached thereto. Another door 39 is mounted below the windows 29 and provides access to a refrigerated storage area 41**.

Figure 5:
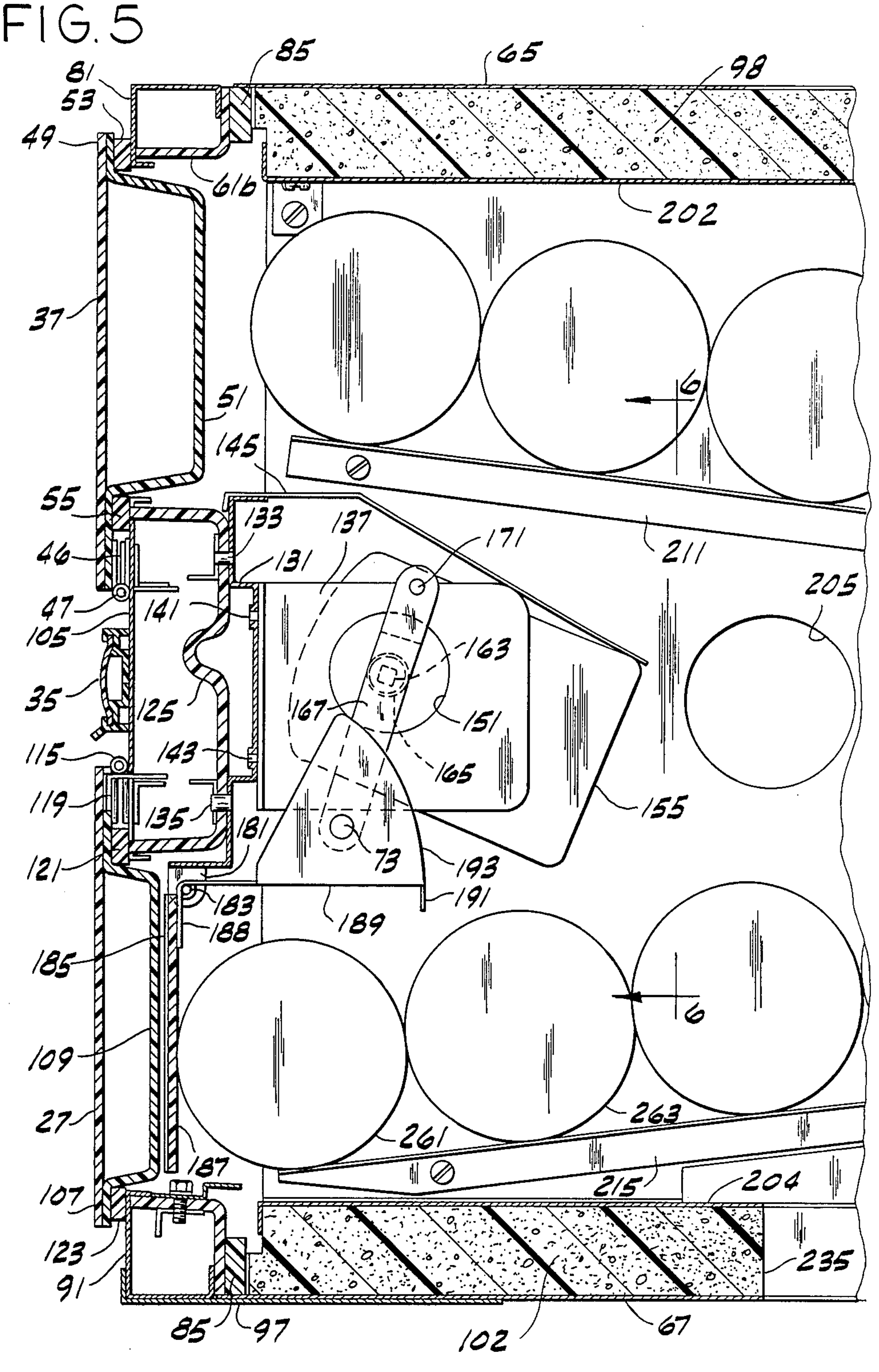
FIG. 5 is a side view of a drink can dispenser of the vending machine in FIG. 1.

As may best be seen in FIGS. 3, 4 and 5, the door 37 is attached to a generally rectangularly shaped housing 48 for enclosing the storage and dispensing area 7. The door 37 is mounted on a strip hinge 47 with spring 46 which tends to keep the door 37 in a vertical or closed position. The spring 46 is an example of spring means tending to keep the door closed. Door 37 consists of two pieces of material, an outside piece 49 and an inside piece 51 with an air insulating space therebetween. The door 37 tends to be pressed against gaskets 53 and 55 by the spring 46 to seal the storage and dispensing area 7. Each of the dispensers 31 has a corresponding opening 61 in the housing 48 behind the door 37. For example, as shown in FIG. 5, dispenser *31b* has an opening *61b* for the insertion of the drink cans into the dispenser *31b*.

The housing 48 includes rear panel 63, top panel 65 and bottom panel 67. The top panel 65 and bottom panel 67 are secured to side panels 71 and 73 and rear panel 63. The housing 48 also includes a front frame 66 which incorporates a top cross member 81, a bottom cross member 91 and a center cross member 105. A sealing gasket 85 seals between the front frame 66 and the top panel 65, bottom panel 67 and side panels 71 and 73. Additional support is provided by overlapping corner piece 97. Pieces of insulating material 98 and 100 are used for insulation around the housing 48.

The center cross member 105 which extends from side panel 71 to side panel 73 has the strip hinge 47 for door 37 mounted thereto and the labelling 35 is also attached to the cross member 105. The clear door 27 is constructed similarly to door 37 and includes outside piece 107 and inside piece 109 with an air space therebetween for insulation. A strip hinge 115 is attached to the center cross member 105 and door 27 to permit the door to swing outward. A spring 119 tends to press the door 27 toward door gaskets 121 and 123 to seal the storage and dispensing area 7. Center cross member 105 includes a C-shaped portion 125 to which is attached channel or mounting bracket 131 by rivets 133 and 135.

Figure 5A:
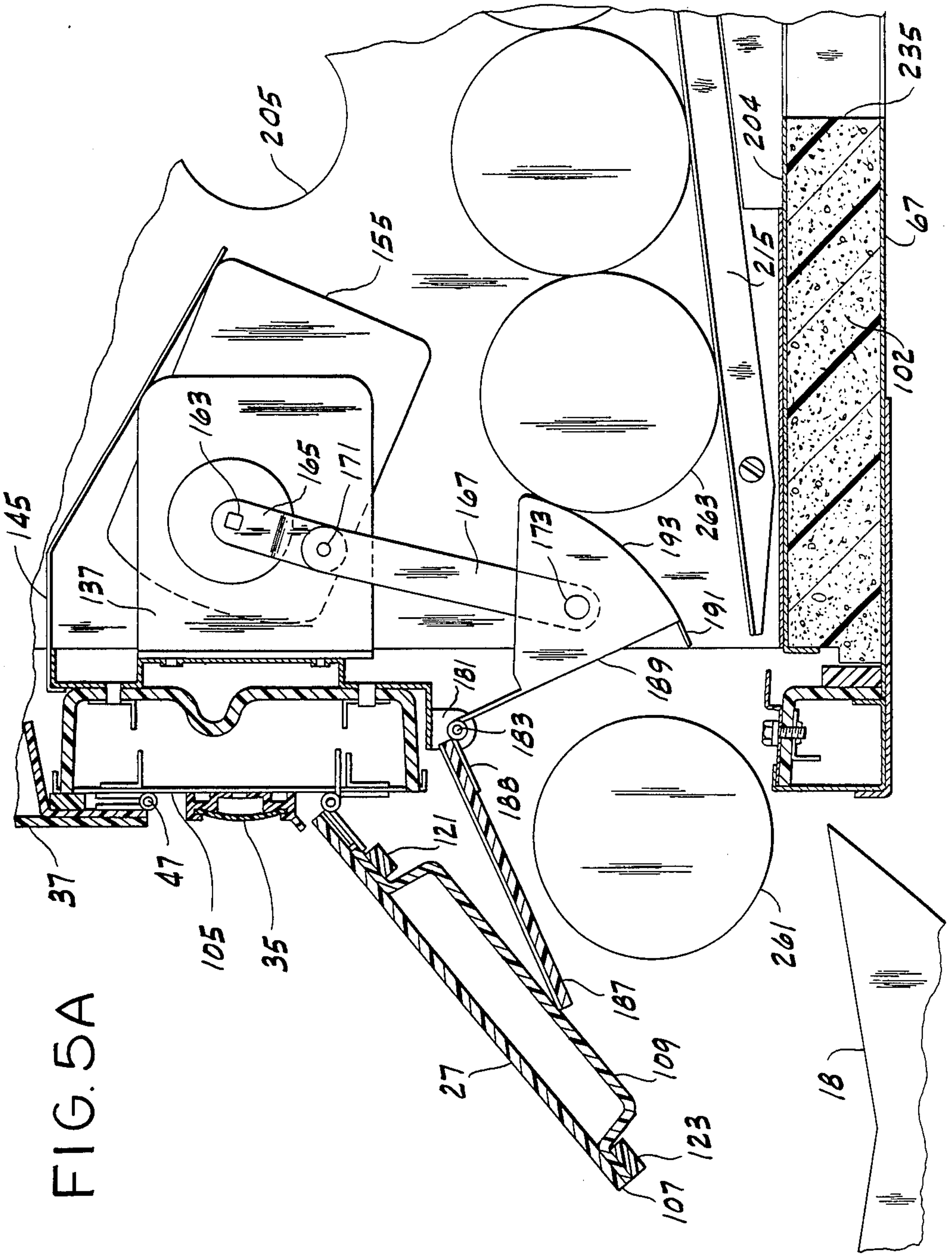
FIG. 5A is a side view of the drink can dispenser in FIG. 5 showing a can being dispensed.
Figure 6:
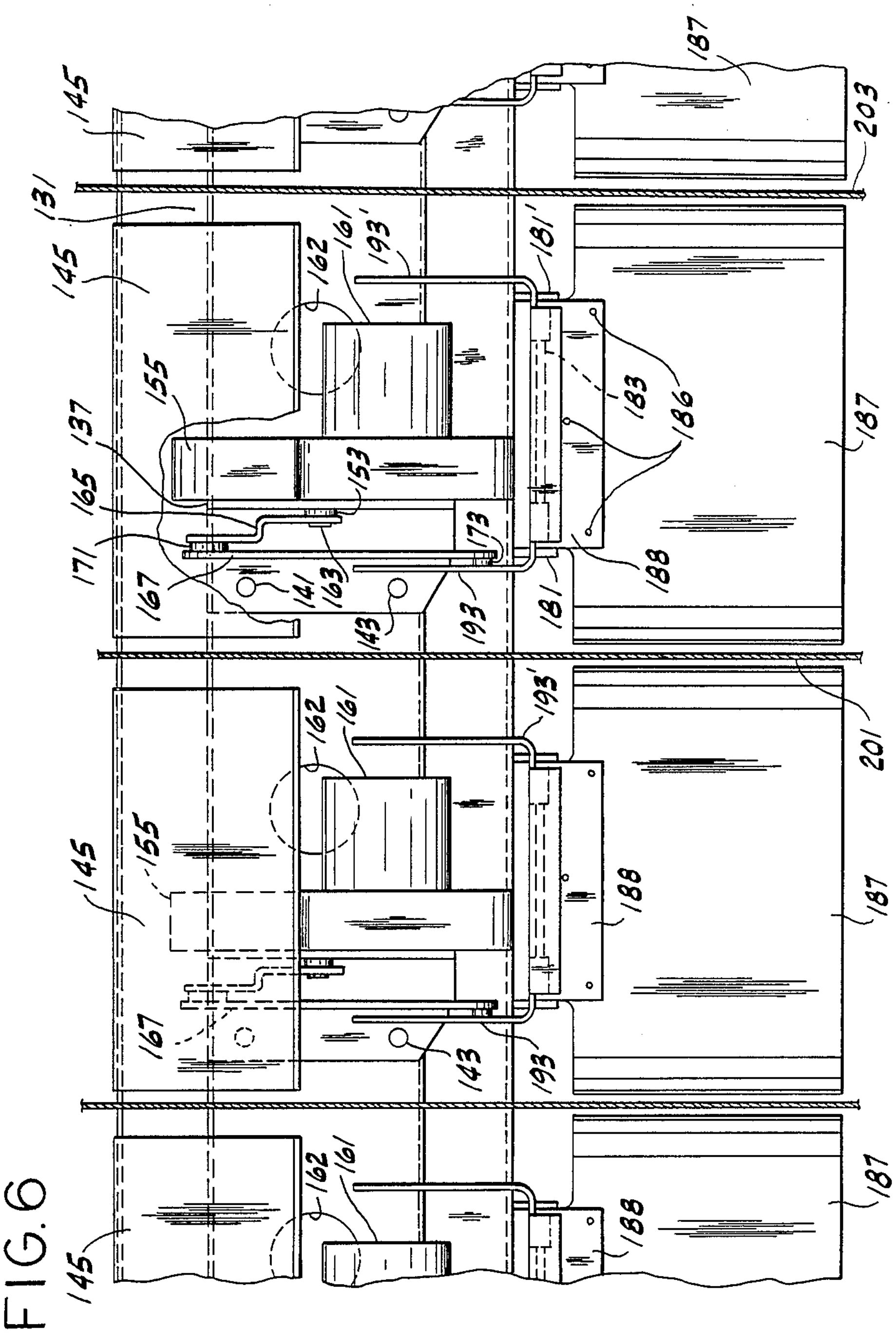
FIG. 6 is a view from the line 6—6 in FIG. 5.

For illustration purposes the dispenser *31b* is shown in FIGS. 3, 5, 5A and 6. As will be readily appreciated the discussion which follows applies to all dispensers 31. For each dispenser 31 an angle bracket 137 is attached to mounting bracket 131 by rivets or screws 141 and 143. Also for each dispenser 31 a cover piece 145 is attached to the mounting bracket 131. The bracket 137 has a circular opening 151 through which a rotating member 153 of a gear assembly 155 protrudes. The gear assembly 155 is secured to the bracket 137 by screws (not shown) and is driven by a motor 161 with control and powering wires (not shown) passing through an opening 162 in bracket 131 (as shown in FIG. 6). These wires connect to the machine controller as shown in FIG. 1 of U.S. Pat. No. 4,512,453. The rotating member 153 has a square drive 163 which is attached to an offset lever 165. A pivoting arm 167 is pivotally attached at end 171 and at an opposite end 173.

Mounting bracket 131 includes for each dispenser 31 hinge supports 181 and 181' which support pivot pins 183 therebetween. Each dispenser 31 has a levered gate 185 which is pivotally attached to one of the pins 183. The levered gate 185 has a clear ejector flap portion 187 attached by rivets 186 to an angle 188. The levered gate 185 also includes a retainer portion 189 which is continuous with the angle 188 and perpendicular to the flap portion 187. The retainer portion 189 includes a lip 191 and pie-shaped segments 193 and 193' at either end. The pivoting arm 167 is pivotally attached to the levered gate 185 at the end 173.

Each of the four dispensers 31 has sides 201 and 203 having openings 205, 207 and 209 to permit air circulation. Additionally, each dispenser 31 has a top 202 and a bottom 204 mounted inside respectively the top panel 65 and bottom panel 67. A piece of insulating material 102 is placed between the bottom panel 67 and bottom 204. Attached to each of sides 201 and 203 is a rearward sloping guide 211 which extends from near the door 37 to near the rear panel 63 (FIGS. 3, 4, 5 and 6). A guide and duct 213 is secured to the sides 201 and 203 and to the bottom panel 67 near the rear panel 63. A frontward sloping guide 215 is attached to each of sides 201 and 203 and extends from near the rear panel 63 to near the door 27.

Figure 7:
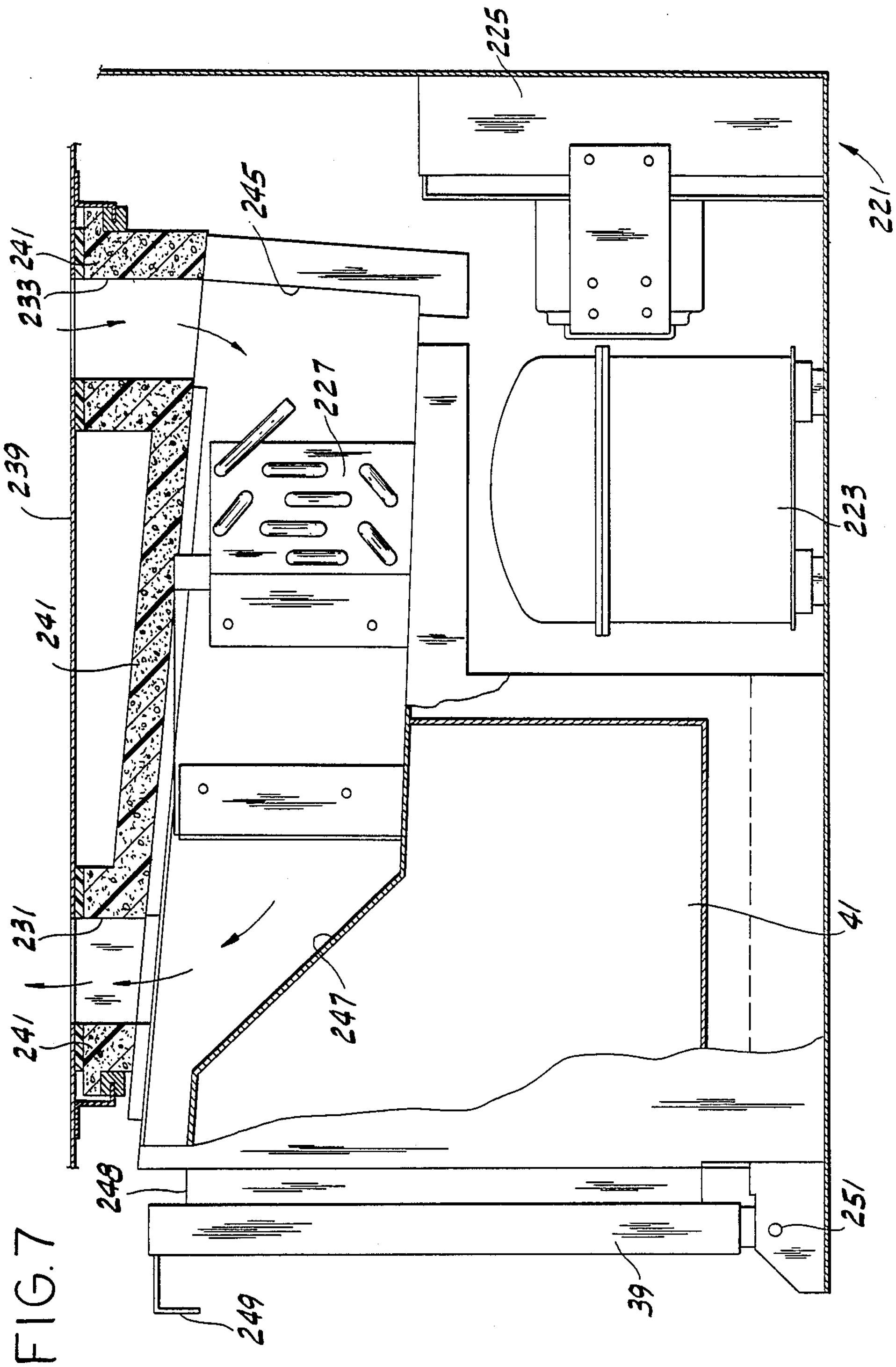
FIG. 7 is a close-up view of a refrigeration unit included in FIG. 3.

As may best be seen in FIGS. 3 and 7 a self-contained refrigeration unit and housing 221 is mounted adjacent the housing 48 for the refrigerated food storage and disensing area 7. The refrigeration unit 221 includes a compressor 223 and condensor coils 225. Cooling or evaporator coils 227 of the refrigeration unit 221 are in an insulated area. There are two openings 231 and 233 formed in a single foam plastic member 241 and matching holes through a top portion 239 of the refrigerator unit and housing 221. These two openings 231 and 233 in the refrigeration unit 221 match openings 235 and 237 in the bottom panel 67 and the piece of insulating material 102. The foam plastic member 241 is thus used to form passageways between the housing 221 and the housing 48. Additional passageways 245 and 247 are found on either side of the cooling coils 227. A motor driven fan (not shown) forces air over the cooling coils 227 and out the opening 231 into the refrigerated storage and dispensing area 7. The air supplied to the refrigerated storage and dispensing area 7 is sufficient to cool the temperature to around 34° F. Cool air also passes into refrigerated area 41 through an opening (not shown) in passageway 247. Air is supplied to the fan from a top area 101 of the refrigerated area 7, between the duct 213 and the rear panel 63 and into the openings 237 and 233. The cooling air thus circulates through the refrigerated area 7 by passing through passageway 247, out the opening 231, into the housing 48, returned from area 101, back through opening 233 and into passageway 245. The refrigerator unit 221 thus constitutes means contained in the housing 15 for cooling the refrigerated foods in the refrigerated storage and dispensing area. In this way housing 48 includes housing means for enclosing only the refrigerated storage and dispensing area to contain the cooling. The opening 231 is thus an example of duct means for directing cooling air into the housing 48 through the opening 235.

The operation and use of the vending machine 1 will now be described. With the door 3 open as shown in FIG. 2 the unrefrigerated foods may be placed between the spiral arms 25 in the unrefrigerated food storage and dispensing area 5. Because the door 3 is clear, different types of these foods may be mixed on each spiral arm. The refrigerated food may be conveniently stored in the refrigerated storage 41 for cooling prior to insertion in the dispensers 31. For example, previously stored drink cans may be accessed through the door 39. The door 39 seals the refrigerated storage area 41 with a gasket 248 and opens by pulling downward on handle 249 thus pivoting the door 39 at hinge 251. These precooled cans may then be conveniently inserted from the front into the dispensers 31 by opening the door 37. Cans are placed in the openings 61 and will move down on the guides 211 and 215. The can nearest the fla portion 187 of levered gate 185, i.e. can 261, will then be visible through the windows 29 and the clear flap portion 187. Because the can 261 is easily visible, different types of cans may be mixed in one of the dispensers 31. The door 3 may then be closed and the vending machine 1 is ready for dispensing. With the door 3 closed cool air escaping from the refrigerated storage and dispensing area 7 will reduce the temperature in the adjacent unrefrigerated storage and dispensing area 5.

Money is inserted into the selection panel 9 and when the proper amount is inserted, the push-button switches 11 on the panel 9 will permit dispensing. The user may conveniently select the food for dispensing since both the unrefrigerated foods in the unrefrigerated food storage and dispensing area 5 and the refrigerated foods in the refrigerated food storage and dispensing area 7 are visible through door 3. The refrigerated food, e.g. the can nearest the flap portion 187, i.e., can 261, may be identified through window 29 and clear flap portion 187. As previously discussed the vendor control and selection system described in U.S. Pat. No. 4,512,453 is used for controlling dispenser motors for both the refrigerated and unrefrigerated foods. The selection panel 9 thus constitutes means for selecting one of the refrigerated foods or unrefrigerated foods to be dispensed to the common receiving device 18.

If an unrefrigerated food is selected for dispensing the motor connected to one of the spiral arms 25 will respond by rotating thus forcing the food to be pushed off the shelf 19. The unrefrigerated food package will then fall into the common receiving device or shelf 18 for retreival by the user.

If a refrigerated food e.g. a drink can is selected for dispensing, one of the motors 161 associated with the selected dispenser will begin rotating. The dispenser 31 starts in a closed position as shown in FIG. 5. This rotation (in the clockwise direction as shown in FIGS. 5 and 5A) causes the rotating member 153 of the gear assembly 155 to turn the offset lever 165. The pivoting arm 167 will pivot at the end 171 and at the opposite end 173. The levered gate 185 will then pivot on the pin 183. The flap portion 187 will push against the inside 109 of door 27 causing the door 27 to open. The lip 191 of retaining portion 189 will proceed into a position between the can nearest the flap portion 187 i.e., can 261, and the can next nearest the flap portion 187 i.e., can 263. The pie-shaped segments 193 and 193′ at either end of the levered gate 185 will then retain the can 263 in the dispenser 31. The rotation will continue and an open position will be reached as shown in FIG. 5A. The levered gate is thus movable between the closed position (FIG. 5) and the open position (FIG. 5A). In the open position the flap portion 187 has pushed the door 27 open so that the can 261 will then fall into the common receiving device 18 for retrieval by the user.

The common receiving device 18 thus constitutes common receiving means adjacent the refrigerated and unrefrigerated storage and dispensing areas for receiving dispensed foods from either the refrigerated or unrefrigerated storage and dispensing area. And the dispensers 31 and the spiral arms 25 are an example of means responsive to the selecting means for dispensing the selected food to the common receiving means.

The rotating member 153 will continue rotating through an entire revolution. Thus, after the open position in FIG. 5A is reached the levered gate 185 will move toward its closed position as shown in FIG. 5. As this rotation progresses the can 263 will eventually move to the position nearest the flap portion 187 when the lip 191 has risen to allow the can to clear it. The levered gate 185 returns to its closed position and all the cans remaining in the dispenser 31 will then move down the guides 211 and 215. Because the guides 211 and 215 extend from front to back, the number of cans that may be stored is increased. The vending machine 1 is ready for dispensing another refrigerated or unrefrigerated food.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vending machine for dispensing refrigerated and unrefrigerated foods comprising:

housing means having a refrigerated storage and dispensing area for the refrigerated foods separate from an unrefrigerated storage and dispensing area for the unrefrigerated foods;

means contained in the housing means for cooling the refrigerated foods in the refrigerated storage and dispensing area;

common receiving means adjacent the refrigerated and unrefrigerated storage and dispensing areas for receiving dispensed foods from either area;

means for selecting one of the refrigerated foods or unrefrigerated foods to be dispensed to the common receiving means;

means responsive to the selecting means for dispensing the selected food to the common receiving means; and another housing means for enclosing the refrigerated storage and dispensing area to contain the cooling, the other housing means having an opening for inserting the refrigerated foods into the refrigerated storage and dispensing area and having a door covering the opening, and spring means tending to keep the door closed.

2. A vending machine as set forth in claim 1 wherein the other housing means has a window therein for viewing the one of the refrigerated foods to be dispensed to the common receiving means.

3. A vending machine as set forth in claim 1 wherein the other housing means has another opening below the first named opening, the other opening for dispensing the refrigerated foods from the refrigerated storage and dispensing area and having another door covering the other opening.

4. A vending machine for dispensing drink containers and food packages comprising:

housing means having a drink container storage and dispensing area separate from a food package storage and dispensing area;

means contained in the housing means for cooling the drink containers in the drink container storage and dispensing area;

common receiving means for receiving dispensed food packages and drink containers, the receiving means being disposed adjacent the drink container storage and dispensing area;

means for selecting one of the drink containers or food packages to be dispensed into the common receiving means;

means responsive to the selecting means for dispensing the selected container or package to the common receiving means; and another housing means for enclosing the drink container storage and dispensing area to contain the cooling, the other housing means having an opening for inserting the drink containers into the drink container storage and dispensing area and having a door covering the opening, and spring means tending to keep the door closed.

5. A vending machine as set forth in claim 4 wherein the other housing means has a window mounted thereon for viewing the one of the drink containers to be dispensed to the common receiving means.

6. A vending machine as set forth in claim 4 wherein the other housing means has another opening below the first named opening, the other opening for dispensing the drink containers from the drink container storage and dispensing area and having another door covering the other opening.

7. A vending machine for dispensing drink containers and food packages comprising:

a housing having a refrigerated drink container storage and dispensing area separate from an unrefrigerated food package storage and dispensing area;

a self-contained refrigeration unit for providing forced cool air circulation into the refrigerated drink container storage and dispensing area;

a common receiving device for receiving dispensed foods, the receiving device adjacent both the drink container and food package storage and dispensing areas;

a selection panel having a plurality of switches for selecting the food package or drink container to be dispensed into the common receiving device;

a drink container dispenser in the refrigerated area having a dispensing mechanism responsive to the switches of the selection panel for depositing one of the containers into the common receiving device;

a food package dispenser having a dispensing mechanism responsive to the switches of the selection panel for depositing one of the food packages into the common receiving device; and another housing for enclosing the drink container storage and dispensing area to contain the cooling, the other housing having an opening for inserting the drink containers into the drink container storage and dispensing area and having a door covering the opening, and spring means tending to keep the door closed.

8. A vending machine as set forth in claim 7 wherein the other housing has a window therein for viewing the one of the drink containers to be dispensed to the common receiving means.

9. A vending machine as set forth in claim 7 wherein the other housing has another opening below the first named opening, the other opening for dispensing the drink containers from the drink container storage and dispensing area and having another door covering the other opening.

10. A vending machine for dispensing refrigerated and unrefrigerated foods comprising:

housing means having a refrigerated storage and dispensing area for the refrigerated foods seperate from and below an unrefrigerated storage and dispensing area for the unrefrigerated foods, another housing means for enclosing only the refrigerated storage and dispensing area to contain the cooling and wherein the refrigerated storage and dispensing area and unrefrigerated storage and dispensing area are adjacent to reduce the temperature in the unrefrigerated storage and dispensing area by heat transfer between them;

further housing means having a door mounted thereto and forming a temporary storage area accessible through the door for reducing the temperature of refrigerated foods such that the refrigerated food may be placed in the temporary storage area prior to placement in the refrigerated storage and dispensing area;

means contained in the housing means for cooling the refrigerated foods in the refrigerated storage and dispensing area and in the temporary storage area;

common receiving means adjacent the refrigerated storage and dispensing area for receiving dispensed foods from either the refrigerated or unrefrigerated storage and dispensing area;

means for selecting one of the refrigerated foods or unrefrigerated foods to be dispensed to the common receiving means; and means responsive to the selecting means for dispensing the selected food to the common receiving means.

11. A vending machine for dispensing drink containers and food packages comprising:

housing means having a drink container storage and dispensing area separate from and below a food package storage and dispensing area;

another housing means for enclosing only the drink container storage and dispersing area to contain the cooling and wherein the drink container storage and dispensing area and food package storage and dispensing area are adjacent to reduce the temperature in the food package storage and dispensing area by heat transfer between them, further housing means having a door mounted thereto and forming a temporary storage area accessible through the door for reducing the temperature of drink containers such that the drink containers may be placed in the temporary storage area prior to placement in the drink container storage and dispensing area;

means contained in the housing means for cooling the drink containers in the drink container storage and dispensing area and the temporary storage area;

common receiving means for receiving dispensed food packages and drink containers, the receiving means being disposed immediately adjacent the drink container storage and dispensing area;

means for selecting one of the drink containers or food packages to be dispensed into the common receiving means; and means responsive to the selecting means for dispensing the selected container or package to the common receiving means.

12. A vending machine for dispensing containers and food packages comprising:

a housing having a refrigerated drink container storage and dispensing area seperate from and below an unrefrigerated food package storage and dispensing area;

another housing means for enclosing only the drink container storage and dispensing area to contain the cooling and wherein the drink container storage and dispensing area and food package storage and dispensing areas are adjacent to reduce the temperature in the food storage and dispensing area by heat transfer between them;

further housing means having a door mounted thereto and forming a temporary storage area accessible through the door for reducing the temperature of drink containers such that the drink containers may be placed in the temporary storage area prior to placement in the drink container storage and dispensing area;

a self-contained refrigeration unit for providing forced cool air circulation into the refrigerated drink container storage and dispensing area and the temporary storage area;

a common receiving device for receiving dispensed foods, the receiving device being disposed immediately adjacent the drink container storage and dispensing area;

a selection panel having a plurality of switches for selecting the food package or drink container to be dispensed into the common receiving device;

a drink container dispenser in the refrigerated area having a dispensing mechanism responsive to the switches of the selection panel for depositing one of the containers into the common receiving device; and a food package dispenser having a dispensing mechanism responsive to the switches of the selection panel for depositing one of the food packages into the common receiving device.

* * * * *